Patented July 10, 1928.

1,676,446

UNITED STATES PATENT OFFICE.

HENRY ADOLPH KOHMAN, ROY IRVIN, AND ERNEST SALATHIAL STATELER, OF PITTSBURGH, PENNSYLVANIA, ASSIGNORS, BY MESNE ASSIGNMENTS, TO THE FLEISCHMANN COMPANY, OF NEW YORK, N. Y.

PRODUCTION OF ENZYMES FOR USE IN THE MANUFACTURE OF BREAD.

No Drawing.     Application filed October 3, 1921. Serial No. 505,125.

In Letters Patent of the United States, No. 1,274,898, granted to Henry A. Kohman, August 6, 1918, for improvements in the manufacture of leavened bread, is described the addition of certain diastatic and proteolytic enzymes to the dough batch whereby it is possible to effect an economy in the amount of yeast normally employed in the bread making operation, and also to lessen materially the quantity of sugar usually added in making up the dough batch. These enzymes, in accordance with the patent referred to are produced by the growth of an enzyme producing fungus upon suitable carbohydrate and protein substances, and the specification points out that a suitable enzyme producing fungus available for the purpose is the *Aspergillus oryzæ*, and especially when grown upon Indian corn or maize, preferably in the condition known as coarse hominy.

If conducted under aseptic conditions, the growth of the fungus upon hominy results in no deterioration in the quality of the bread produced from the enzyme product, and, in fact, during long continued use no such deterioration of the bread was due to the employment of the enzyme product in the bread making operation. Occasionally, however, when the enzyme product has been used, it has been found that the bread to some degree, at least, has a tendency to what is known in the bread making art as "ropiness", leading to the impression that this may have been due to some degree to infection of the enzyme product by the bacteria recognized in the art as the main source of that condition.

We have now ascertained that wherever it is impractical or difficult to conduct the incubating process for the growth of the enzymes under aseptic condition, it is nevertheless feasible to inhibit the infection of the enzyme product by the rope producing bacteria by a modification in the conditions which, while having the desired inhibiting effect, likewise has the positive advantage of facilitating the growth of the *Aspergillus oryzæ* upon the hominy, or the like, and the additional advantage that the enzyme product is more uniform in its action and even gives a somewhat larger loaf volume.

In the patent referred to, the hominy is caused to absorb an appropriate amount of water until the individual particles have swollen to say twice or more than twice their original size, and the seeding stock obtained by cultivating the *Aspergillus oryzæ* upon a suitable culture medium is intimately mixed with the water swollen particles of hominy so as to inoculate the mass which is thereafter subjected to incubation until a cake like body is formed by the spreading of the mycelium throughout the mass, all as described in detail in the specification of the patent.

In this procedure unless carried out under aseptic conditions, there is the possibility that the rope producing organisms may contaminate the mass either by introduction through the hominy, or in some adventitious way.

Our present invention is based upon the discovery that by the addition of acid to the water in which the hominy is cooked, the growth of the rope producing organisms is inhibited and the growth of the *Aspergillus oryzæ* stimulated,—it being found that the *Aspergillus oryzæ* will tolerate a sufficiently large proportion of acid, in the water employed, to fully prevent the propagation of the rope producing organism while still favoring the growth of the *Aspergillus oryzæ* itself. In carrying out our invention we may employ any suitable acid, either organic or inorganic, but we prefer and recommend the employment of the weaker acids such as lactic acid, tartaric acid, citric acid, malic acid, phosphoric acid and the like.

As a typical example of the practice of the invention, we may particularly specify the conditions of practice when lactic acid is employed, this example serving as a typical illustration of the manner in which the invention may be practiced. In such case, we prefer, as in the patent referred to, to use, as the growing medium, coarse hominy, that is to say, Indian corn or maize which has been decorticated, deprived of its oily germ, and coarsely cracked, say into halves. The hominy grains are then caused to absorb a quantity of water sufficient to soften and swell them to say twice or more than twice their original size,—this water being first acidulated by the addition of the lactic acid, in the proportion of 100 lbs. of hominy, 75 lbs. of water, 1 to 4 lbs. of lactic acid. The absorption, by the hominy grains, of the acidified water may be practiced in accordance with the directions given for the absorption of water alone in the patent referred to, and with the production of water-swollen particles of hominy presenting the same fairly dry appearance and adapted to be intimately mixed with the seeding stock, which is in the form of a dry powder. The seeding stock itself, in the preferred practice of the invention, is obtained by cultivating the *Aspergillus oryzæ* upon hominy cooked with say 35% of water in which, preferably 4% to 8% by weight of common salt (NaCl) is dissolved, together with from 1% to 3% by weight of lactic acid calculated on the weight of the hominy employed. It will be noted that the hominy used as the culture medium for the growing of the seeding stock is cooked in only 35% its weight of water instead of 75%. The lesser amount of water thus employed for cooking the hominy used as the culture medium for the seeding stock permits the corresponding reduction of the quantity of acid employed calculated upon the weight of the hominy, as will readily be understood. The batch of hominy upon which the *Aspergillus oryzæ* is to be cultivated to form the seeding stock, having been thus inoculated with the *Aspergillus oryzæ* culture, is then subjected to the incubating process for seeding stock described in the patent, with the production of a finished mass containing mycelium and spores, which mass is thereupon dried and powdered so as to form the seeding stock in its ultimate condition, i. e., as a dry powder.

As hereinbefore noted the seeding stock, in the form of a dry powder is intimately admixed with the swollen particles of hominy from which the enzyme product is to be obtained. The subsequent treatment of this mass for the production of the enzyme product and for the later production of a concentrated or unconcentrated solution of the enzymes contained therein or for the production of a ground meal or fine powder does not differ from the similar treatment described in the patent and need not be further elaborated herein. So also, the manner of use of the enzyme product in the manufacture of leavened bread does not differ from the manner of use of the enzyme product of the patent and is fully set forth therein. So also, the advantages of the product in the manufacture of leavened bread parallel the advantages described in the patent, with the additional features hereinbefore noted, that is to say, those advantages incident to the inhibition of the growth of the rope-producing organisms in the enzyme product, and the increased efficiency of the enzyme product from the standpoint of uniformity in its action with respect to loaf volume of the bread.

From the foregoing description of the use of lactic acid, as one of the acids which may be employed in carrying out our invention, it will be apparent that there is a sufficiently wide gap between the percentage of lactic acid which will inhibit the propagation of the rope-producing organisms and the percentage of lactic acid which the *Aspergillus oryzæ* will tolerate, to provide a satisfactory safety factor within which the operator may proceed efficiently, i. e., not only to entirely inhibit the growth of the rope producing organisms, but also to obtain a notable stimulation of the growth of the *Aspergillus oryzæ* itself. Similar comparative percentages may be established for other acids so that they likewise may be employed with safety and to advantage, both for the inhibition of the growth of the rope-producing organisms, and for stimulating the growth of the *Aspergillus oryzæ*.

As an example of the margin of safety with several acids, we have found in culture tubes that the rope-producing organisms will not grow in .051% lactic acid, while the *Aspergillus oryzæ* thrives in the same medium (agar-agar culture medium) with a lactic acid content of 2.33%. For sulphuric acid, the differential between the percentage required to prevent the growth of the rope-producing organisms and the percentage within which the *Aspergillus oryzæ* will thrive we have found to be, respectively, .065% and 0.13%. For tartaric acid .12% and .4%, respectively. For phosphoric acid .10% and .40%. For citric acid .5% and 3+%.

The culture tube method, with the use of an agar-agar culture medium, or the like, will permit the operator to determine, for any given acid the two differentials referred to. When the maximum quantity of acid which the *Aspergillus oryzæ* will tolerate in the culture tubes has been determined, it is generally found that a somewhat larger quantity may be used in the cooked hominy medium, for the reason that the hominy acts as a "buffer", reducing somewhat the acidity.

In some instances, it will be found of advantage to the growth of the *Aspergillus oryzæ* that more than one acid be employed as the inhibiting agent. For example, the combined use of lactic acid and phosphoric acid is advantageous to the rapidity of growth of the *Aspergillus oryzæ* and to the ultimate strength of the enzyme product, and it is further found that without exceeding the safety limit for the *Aspergillus oryzæ* growth where lactic acid and phosphoric acid are used conjointly it is feasible to employ somewhat more than one half of the quantity tolerated by the *Asper-*

*gillus oryzæ* of each of the constituent acids.

It has heretofore been proposed, as is well known, to prevent ropiness in bread by the introduction of acids into the dough batch itself. The percentage of acid which can be tolerated in a dough batch, however, does not exceed about .10%, for the reason that the introduction of a larger quantity breaks down the gluten and destroys the desired texture of the loaf; whereas, even this maximum, tolerable in the dough batch, is insufficient to do more than partially inhibit the growth of the rope-producing organisms. For this reason, it would be impracticable, and, in fact, impossible to successfully employ an acid for preventing the propagation in the dough batch of the relatively large quantities of the rope-producing bacteria which would be introduced into the bread by a seriously infected enzyme product. Moreover, the discovery that the use of acids in the incubation of the *Aspergillus oryzæ* upon the hominy not only inhibits the growth of the rope-producing bacteria, but also stimulates, within limits of addition of the acid, the growth of the *Aspergillus oryzæ* itself is, of course, not indicated in any way in the treatment of bread dough with acid.

By the term "tolerated" as used in the foregoing specification and appended claims, we mean that quantity of acid which may be added to the medium on which the fungus is grown without causing a lesser growth of the fungus than can be obtained without any additional acid.

We claim:

1. The method of producing an enzyme product of fungus origin for use in the manufacture of bread, which comprises cultivating *Aspergillus oryzæ* upon a moist mass of ground hominy containing from 1 to 4 percent by weight, with respect to the hominy, of lactic acid.

2. The method of producing an enzyme product of fungus origin for use in the manufacture of bread, which comprises admixing 100 parts by weight ground hominy with about 75 parts by weight of water, containing from about 1 to 4 percent by weight, with respect to the hominy, of lactic acid, heating the admixture until the acidulated water has been absorbed by the hominy, inoculating the acidulated hominy with *Aspergillus oryzæ*, and incubating.

In testimony whereof we affix our signatures.

HENRY ADOLPH KOHMAN.
ROY IRVIN.
ERNEST SALATHIAL STATELER.